United States Patent [19]

Chattler

[11] Patent Number: 4,605,827
[45] Date of Patent: Aug. 12, 1986

[54] LINE FAULT DISCRIMINATOR

[75] Inventor: Leo M. Chattler, Moraga, Calif.

[73] Assignee: DCM Industries, Inc., San Leandro, Calif.

[21] Appl. No.: 295,677

[22] Filed: Aug. 24, 1981

Related U.S. Application Data

[63] Continuation of Ser. No. 119,487, Feb. 7, 1980, abandoned.

[51] Int. Cl.⁴ .............................................. H04B 3/46
[52] U.S. Cl. ............................... 179/175.3 F; 324/52
[58] Field of Search ................ 179/175.3 F, 175.3 R; 340/650–652, 664; 324/51, 52, 62

[56] References Cited

U.S. PATENT DOCUMENTS

| | | | |
|---|---|---|---|
| 3,754,221 | 8/1973 | Stelter | 340/651 |
| 3,757,169 | 9/1973 | Beresnikow | 340/650 |
| 3,816,816 | 6/1974 | Schweitzer, Jr. | 340/664 |
| 3,868,665 | 2/1975 | Treglown | 340/651 |
| 3,912,882 | 10/1925 | Beerbaum | 179/175.3 R |
| 3,969,711 | 7/1976 | Ahntholz | 340/651 |
| 4,415,779 | 11/1983 | Bowman | 179/175.3 F |

Primary Examiner—Stafford D. Schreyer
Attorney, Agent, or Firm—Manfred M. Warren; Robert B. Chickering; Glen R. Grunewald

[57] ABSTRACT

An auxiliary test system for use with a long transmission line such as one having a telephone at an end thereof whereby from a remote central test station a line may be tested for a short between wires, an open, an abnormal load condition or reversed connections and the relative location of such a fault condition determined.

14 Claims, 5 Drawing Figures

LINE FAULT DISCRIMINATOR

This is a continuation of application Ser. No. 119,487, filed Feb. 7, 1980, now abandoned.

My invention relates to detection circuits and more particularly circuits that can detect continuity, line connection reversal and abnormal load conditions such as line faults, and indicate relatively where within a line a problem condition has occurred.

Circuits for the detection of such problems are not new to industry, but they generally have many deficiencies which, in order to overcome, would increase their cost and decrease reliability. For example, their operation may depend upon moving parts such as relays; to use them may require interrupting service; they may require expensive and elaborate monitoring equipment; or they may, because of their complexity, be prone themselves to being the fault.

Among the objects of my invention are:

(1) To provide a novel and improved means for detecting the relative location of a problem condition in a transmission line such as in a telephone system;

(2) To provide a novel and improved means for detecting the relative location of a problem condition without interrupting line service;

(3) To provide a novel and improved means without moving parts for detecting the relative location of a problem condition in a transmission line;

(4) To provide a novel and improved means requiring no disconnect devices for detecting the relative location of a problem condition in a transmission line;

(5) To provide a novel and improved means requiring no timing consideration for detecting the relative location of a problem condition in a transmission line;

(6) To provide a novel and improved means for detecting the relative location of a problem condition that can detect which wire is at fault in a multi-wire transmission line;

(7) To provide a novel and improved means for detecting from a central station lines cross-connected at a remote load.

Additional objects of my invention will be brought out in the following description of a preferred embodiment of the same wherein.

Figure 2:
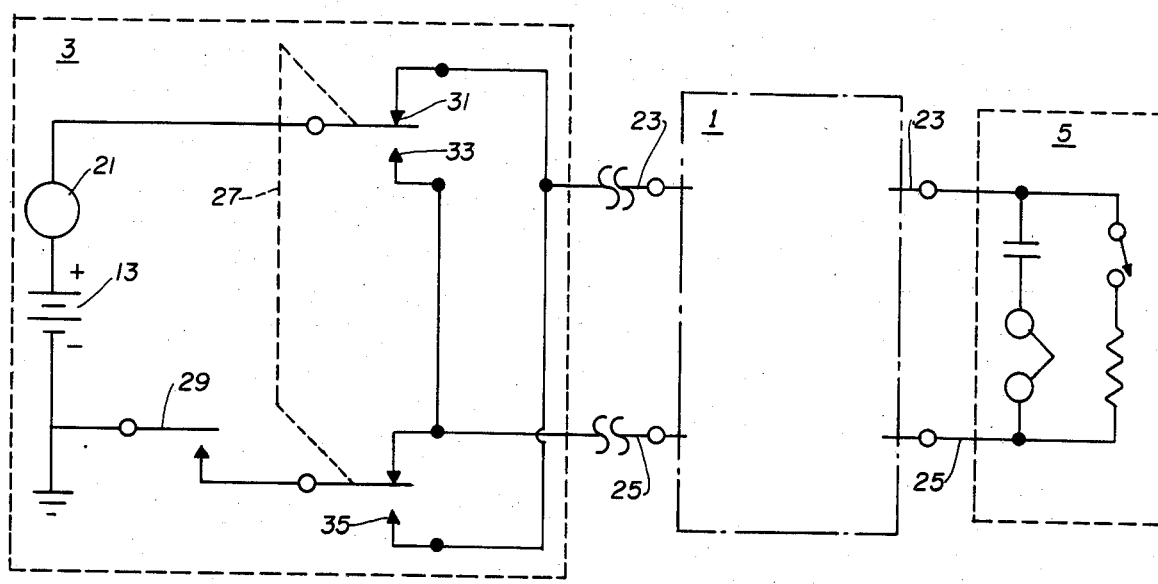
FIG. 2 is a schematic of a system including a telephone installation depicting where the invention would be installed therein.
Figure 1:
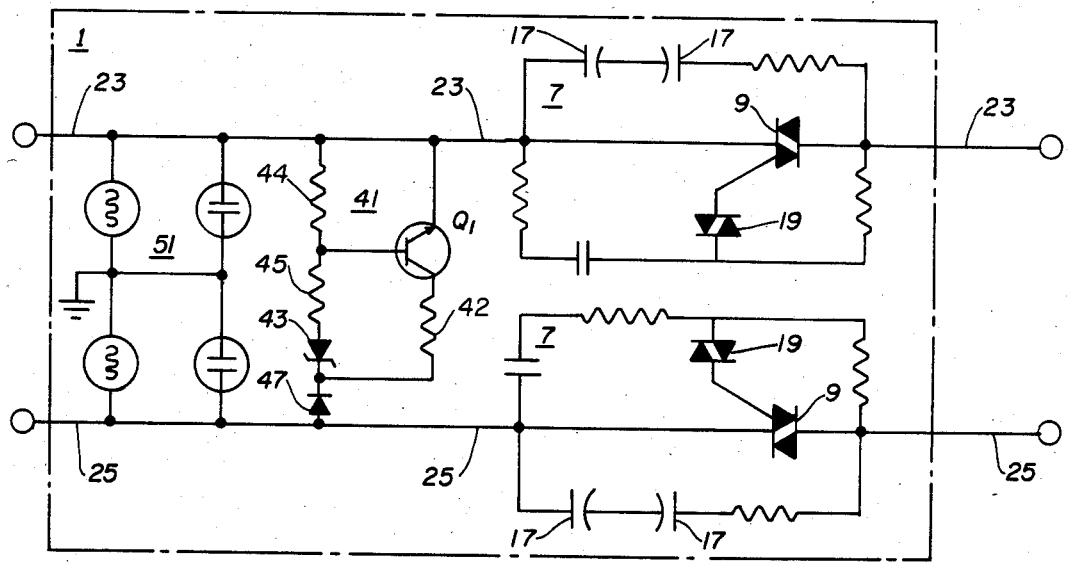
FIG. 1 is a schematic of the invention in its simplest form.

Referring to the drawings for details of my invention in its preferred form, the same comprises a system 1 auxiliary to and integral with a lengthy line having a remote operating station 3 at one end and a load 5 such as a telephone apparatus at the other. The auxiliary system is interposed in the line, generally in proximity to the load and is responsive to an abnormal change in the load to create a phenomenon interpretable at the remote operating station.

The auxiliary system includes an electronic circuit 7 comprising a controllable current inhibiting means 9 in the main line circuit that under normal condition allows conduction of current in both directions to and from the load and under abnormal conditions, such as a fault in the load, cuts off or inhibits conduction therethrough in both such directions. Such a device in the preferred embodiment takes the form of a silicon bi-directional triac thyristor which in this circuit is designed to respond to load resistance below 250K Ohms to go into a cutoff mode.

A direct current power source 13, located at the remote operating station 3 may be applied to such a lengthy line that exhibits an existing fault somewhere along its length. With a fault condition below 250K Ohms occurring at the load and conduction inhibited through the triac, a resistive capacitance charging current will be diverted to charge a capacitance means 17 in the electronic circuit situated in parallel with the triac. As the capacitance means approaches the D.C. source voltage, current flow in the circuit approaches zero and a diac triggering device 19 in the triac control circuit responds by generating a trigger pulse which will turn on the triac to again allow conduction therethrough. Such uninhibiting of the main line circuit now provides a path through the triac through which the capacitance means may discharge until such time as it becomes discharged. The faulty load will again cause the triac to go into a cutoff condition and current will again be diverted to the capacitance means and the cycle repeated. Thus the auxiliary circuit 1 will cyclically allow and inhibit conduction therethrough in response to an abnormal load condition on the load side of such circuit.

This cyclic response occasioned by conduction and nonconduction phases of the triac cause voltage at the operating station end of the circuit to approach D.C. source voltage during triac cutoff and to approach a somewhat lower voltage during triac conduction. The voltage seen at this point during conduction will be dependent upon the resistance of the responsible fault on the load side of the circuit, as the capacitance means is discharged through it. This rise and decay in voltage is detectable with the aid of a suitable volt meter 21 which may be located at the remote control station along with the D.C. supply source. This meter responds to the rise and fall of voltage by oscillating, with the voltage value of the oscillation indicative of the leakage resistance at the load fault.

A fault on the line side of the auxiliary circuit will not cause the circuit to react in the same manner as a fault on the load side. In the former situation the capacitance necessary to cause the cyclic voltage change is not electrically in the fault circuit and any voltage drop across a fault will therefore be indicated by a stable reading on the meter.

Figure 3:
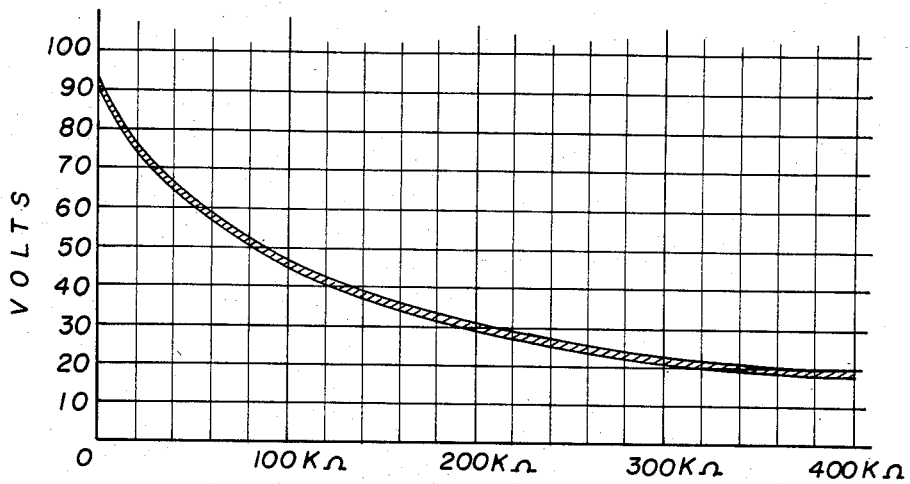
FIG. 3 is a graph depicting the resistance of a fault to ground on the load side of the circuit on the basis of voltage read at the meter.
Figure 4:
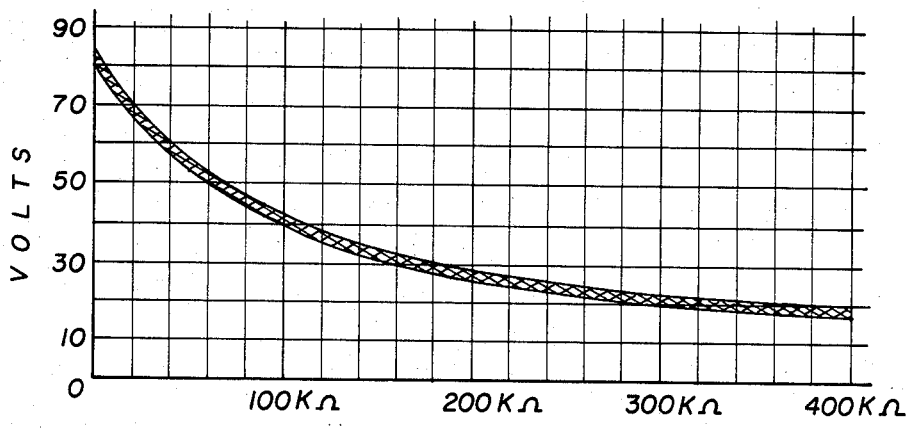
FIG. 4 is a graph depicting the resistance of a fault between two wires on the load side of the circuit on the basis of voltage read at the meter.
Figure 5:
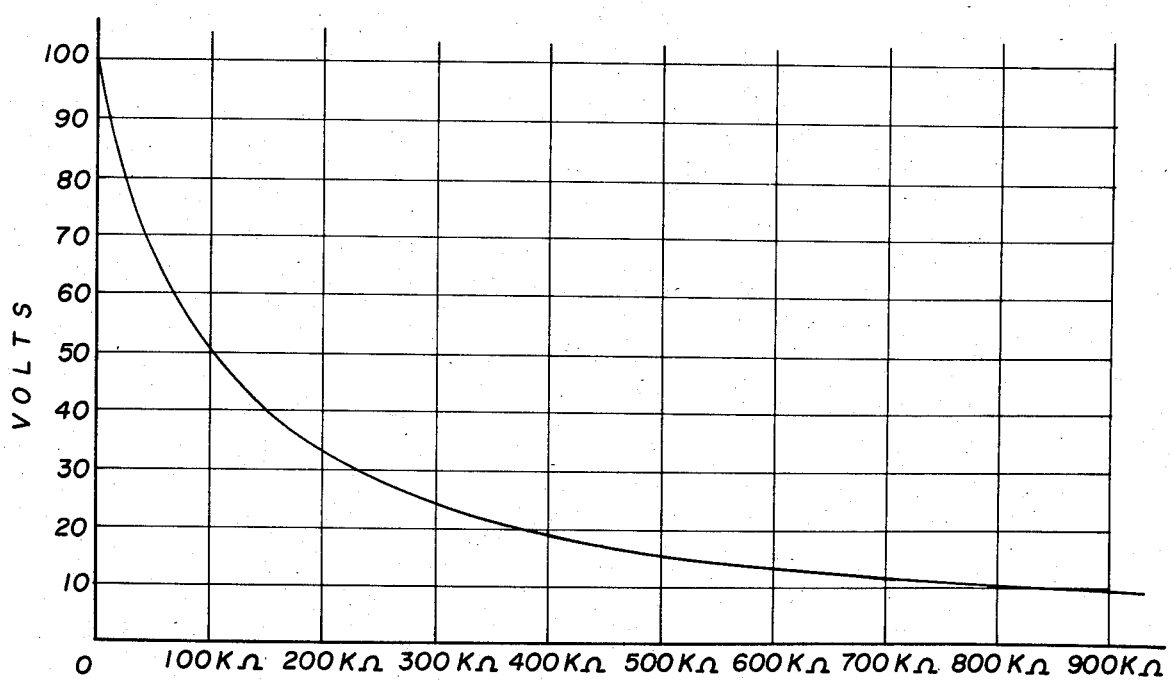
FIG. 5 is a graph depicting the resistance of a fault in the line on the test station side of the circuit on the basis of voltage read at the meter.

The resistance of a fault is determinable by calculation involving that portion of the supply voltage dropped across it which, in the preferred embodiment, is directly readable at the meter. It may be expressed by the formula $$E_2 = \frac{R_1}{R_1 + R_2} E_1,$$

where $E_2$ is the reading on the volt meter, $R_1$ is the rated resistance of the meter, and $E_1$ is the D.C. supply voltage. Typical values used in the preferred embodiment include a D.C. supply of 100 volts, a 120v/100K Ohm meter and capacitance means 17 of 47 microfarads. A graph depicting resistance of a fault on the load side from either of two lines 23, 25 to ground on the basis of the voltage reading at the meter is shown in FIG. 3. A graph indicating the resistance of a fault on the load side between the two lines 23, 25 is depicted in FIG. 4, and a graph depicting the resistance of a fault on the line side on the basis of a voltage reading at the meter is shown in FIG. 5.

A typical telephone system will include the two wires 23, 25 in a test arrangement as depicted in FIG. 2, where a switching apparatus 27, included at the remote operating station, is used to assist in isolating the fault to either of the two lines or between the two lines. The switching apparatus functions as follows:

Leakage between line 23 and ground is measured with all contacts of the switching apparatus in a normal position as depicted in FIG. 2 with the ground contact 29 open. This provides a path from ground through the battery through normally closed contacts 31 of the switching apparatus, transmission line 23, that part of the auxiliary circuit associated with line 23, and through that part of the telephone apparatus connected to line 23.

A no fault condition will be indicated by a stable meter reading of some finite voltage dependent upon a normal very high resistance load. A fault anywhere along the line will complete a circuit to ground through a fault resistance lower than the normal load resistance and will be indicated by a stable meter reading if the fault has occurred on the line side of the auxiliary circuit and by an oscillating meter reading if the fault has occurred on the telephone apparatus side of the circuit.

By changing the switching apparatus contacts into a reverse position with contacts 33, closed the meter and the battery will be now connected to line 25 and a similar test can be made for a fault in that line.

Because of a polarizing circuit within the auxiliary system that will be discussed later, a no fault indication when testing line 23 is indicated by a stable meter reading of 24–32 volts while a no fault condition in line 25 is indicated by a stable meter reading of 0 volts.

A test for leakage between lines 23 and 25 may be made with the contacts of the switching apparatus in the reverse position and the ground contact 29 closed. This provides a path from ground through the battery, through the meter, through the reverse contacts of the switching apparatus, through line 25, through the auxiliary circuit associated with line 25, and to the line 25 segment of the telephone apparatus load. Another circuit is from ground, through the ground contact of the switching apparatus, through a second reverse contact 35 of the switching apparatus, through line 23 to the auxiliary circuit associated with that line and into the line 23 segment of the telephone apparatus. A fault occurring between lines 23 and 25 on the telephone apparatus side of the auxiliary circuits will appear as a fault to ground as line 23 has been grounded through the contacts of the ground switch and the auxiliary circuit will oscillate providing an indication on the meter.

It is advantageous to be able to confirm line continuity to an installation and to be able to detect whether the lines have been reversedly attached thereat. To this end, a polarized test, load 40 is available that may be included in the test circuit by means of a certain configuration of the switching apparatus, whereby the apparatus contacts are in the normal position with the positive side of the battery connected to line 23 and the ground switch closed.

The test load includes a circuit with a transistor Q1 and a load resistor 42 in series with its collector, applied between the two lines 23, 25. Triggering the transistor into conduction is controlled by a zener diode 44 in the base to collector circuit which allows the transistor to be turned on when the zener rated voltage appears across the diode. Two other resistors 44, 45 in the base circuit provide the necessary bias, such that when the zener diode allows the transistor to turn on, the load resistor 42 is included in the circuit with the battery and the switching apparatus at the test desk. A diode 47, having a high breakdown voltage as compared to the D.C. supply voltage is installed between the test load and the line 25 in a direction to polarize the test load to keep it from turning on when reverse voltage is applied.

Thus, with the switching apparatus in a polarity test position, a continuous line connected properly will be indicated by a stable meter indication of some finite voltage at the remote operating station. The value of the stable meter reading is determined by the percentage of the voltage dropped across the test load which is in conduction at this time. If the line is open or the polarity is reversed because the wires are crossed, the circuit will appear open because of the direction of installation of the diode 47 and the meter will read zero volts.

Typical values for elements of the above described circuit which would permit functioning as disclosed are a load resistor 42 of 150K Ohms, bias resistors 44 and 45 of 1M and 330K Ohms respectively, a zener diode rated at 75 volts, and diode 47 with a breakdown voltage of 600 volts.

There is generally introduced in telephone installation a means 51 for protecting the installation electrically against any high voltages such as lightning to which the line may at some time be exposed. The auxiliary electronics circuits of the current invention may be incased within the same package as such protection means 51 for ease, convenience and simplicity of installation.

It should also be noted that capacitors 17 are large enough to pass voice frequencies and the lowest ringing frequency likely to be encountered. If the line fault itself is not severe enough to completely block use of the system for voice or ringing, the line may be tested for such fault while being used for communication. In a telephone system for example, the test may be conducted even while a user may be calling the telephone company over the faulty line to complain.

From the foregoing description of my invention in its preferred form, it will become apparent that the same is subject to alteration and modification, without departing from any underlying principles involved, and I do not desire to be limited in my protection to the specific details illustrated and described, except as may be necessitated by the appended claims.

I claim:

1. An auxiliary system for determining the existence of an abnormal change in load at the load end of a transmission line, said auxiliary system comprising a remote operating test station at the opposite end of said line and means, interposed in series in said line in proximity to said load and directly responsive to such abnormal change in load, for creating a phenomenon interpretable at said remote operating station as an abnormal change in load, said means responsive to said abnormal change in load including an electronic circuit in said line in series relationship with said load, said electronic circuit including a load side and a line side with said circuit being responsive only to said abnormal change in load occurring on the load side of said circuit.

2. An auxiliary system in accordance with claim 1, characterized by said electronic circuit including controllable inhibiting means for selectively allowing conduction of current through said circuit uninhibited under normal load conditions and responding to a abnormal load by periodically inhibiting such current flow to induce a rise and decay of voltage on said line side, whereby said rise and decay of voltage may be detected and interpreted at a remote operating station.

3. An auxiliary system in accordance with claim 2, characterized by said circuit including triggering means for triggering said inhibiting means to allow current flow through said circuit, said triggering means being responsive to a no-current flow condition in said circuit, and said inhibiting means being responsive to abnormal load conditions to inhibit current flow through said circuit and being responsive to said triggering means to uninhibit current flow through said circuit.

4. An auxiliary system in accordance with claim 3, characterized by said remote operating station including a source of power comprising voltage and current.

5. An auxiliary system for determining the existence of an abnormal change in load at the load end of a transmission line, said auxiliary system comprising a remote operating test station at the opposite end of said line and means, interposed in series in said line in proximity to said load and directly responsive to such abnormal change in load, for creating a phenomenon interpretable at said remote operating station as an abnormal change in load, said means reresponsive to said abnormal change change in load including an electronic circuit in said line in series relationship with said load, said electronic circuit including a load side and a line side with said circuit being responsive only to said abnormal change in load occurring on the load side of said circuit, said electronic circuit including controllable inhibiting means for selectively allowing conduction of current through said circuit unihibited under normal conditions and responding to a abnormal load by periodically inhibiting such current flow to induce a rise and decay of voltage on said line side, whereby said rise and decay of voltage may be detected and interpreted at a remote operating station, said circuit further including means for triggering said inhibiting means to allow current flow through said circuit, said triggering means being responsive to a no-current flow condition in said circuit whereby, said inhibiting means responds to such abnormal load to inhibit current flow through said circuit and responds to said trigger to uninhibit current flow through said circuit, said remote operating station including a DC supply source of power comprising voltage and current, said means for triggering said inhibiting means including capacitance means, means for developing a charge across said capacitance means and a trigger pulse generating means responsive to such charge for generation a pulse to trigger said inhibiting means into conduction, said capacitance means and said trigger pulse generating means including an electrical relationship with said current inhibiting means and said line whereby, when current conduction is inhibited through said circuit, current is directed to said capacitance means, voltage at said capacitance means builds up to the value of said DC supply voltage as said current at said capacitance means approaches zero, a condition is created for said trigger pulse generating means to generate a trigger to which said current inhibiting means responds by uninhibiting current conduction through said circuit to provide a discharge path for said capacitance means until such time as such abnormal load condition again causes said current condition inhibiting means to again inhibit current through said circuit and thus create a cyclic rise and decay of voltage on said line, which may be detected and interpreted at said remote operating station.

6. An auxiliary system in accordance with claim 5, characterized by said remote operating station including a meter having an indicator for oscillating in response to an abnormal load on the load side of said electronic circuit and registering a steady voltage level in response to an abnormal load on the line side of said circuit.

7. An auxiliary system in accordance with claim 6, characterized by said system coupled to a segmented load comprising a plurality of lines connected thereto at different segments thereof with each of said segments susceptable to an abnormal load condition therein, means connected in each of said lines in proximity to such load for responding to an abnormal load condition in that segment of such load involving said line, and means proximate said remote operating station for selectively testing for such abnormal condition in each of said load segments.

8. An auxiliary system in accordance with claim 7, characterized by said means for testing for such abnormal load condition including a switching means installed between said plurality of lines and said power source and meter whereby, said power source and meter may be selectively switched between each of said plurality of lines for testing the portion of such load on the end of each of said lines.

9. An auxiliary system in accordance with claim 7, characterized by said system including means for testing for continuity and cross-connected lines between a line pair, said testing means including polarizing means comprising a polarizing circuit between said line pair, means for polarizing one line with respect to another and allowing current flow through said circuit from one line of said line pair to the other line of said line pair in a single direction only whereby, a continuous properly connected line will be indicated by a finite voltage reading at said meter and an open or cross-connected line which will not support current flow through said circuit and will therefore be indicated by a zero voltage reading at said meter.

10. An auxiliary system in accordance with claim 9, characterized by said line pair being selectively connected to said DC supply voltage for testing, said polarizing circuit comprising a diode with a breakdown voltage greater than that of said DC supply voltage whereby, said diode may be installed in circuit with said DC source to prevent current flow between said line pair in one direction and allow current flow in the other such that if said line pair were reversedly connected no current would flow through said circuit and zero volts would register at said meter.

11. An auxiliary system in accordance with claim 10, characterized by said polarizing circuit including a test load installed between said diode and one line of said line pair, a transistor coupled with said test load and means for selectively including said test load in a circuit between said line pair whereby, current flows through said load only when said transistor is turned on and polarity of said line pair is not reversed.

12. In combination, a transmission line such as for use in a telephone installaion including a telephone on one end thereof, means including an electronic circuit in series in said line in proximity to said telephone and a remote test station including means controllable, via the transmission line, by an operator for determining the existence of a fault with respect to said electronic circuit without interfering with telephone communications over said transmission line, whereby, faults may be tested concurrently with normal telephone use.

13. A combination in accordance with claim 12, characterized by a source of D.C. test current, said electronic circuit including a load side and a line side with said circuit being reponsive only to such fault occurring on the load side of said circuit, said circuit including controllable inhibiting means for selectively allowing conduction of said test current through said circuit uninhibited under normal load conditions and responding to a fault by periodically inhibiting such test current flow to induce a rise and decay of voltage on said line side, whereby said rise and decay of voltage may be detected and interpreted at said remote test station.

14. A combination in accordance with claim 13, characterized by said circuit including parallel means bypassing said current inhibiting means for passing telephone communications during periods when said inhibiting means periodically inhibits test current through said circuit whereby, telephone communications may proceed uninterrupted concurrently with testing for faults.

* * * * *